United States Patent [19]
Schiessle et al.

[11] Patent Number: 5,275,049
[45] Date of Patent: Jan. 4, 1994

[54] MULTICOMPONENT ACCELERATION SENSOR

[75] Inventors: Edmund Schiessle, Schorndorf; Khaldoun Alasafi, Schwäbisch-Gmünd; Ralf Gutöhrlein, Fellbach-Schmiden, all of Fed. Rep. of Germany

[73] Assignee: Mercedes-Benz AG, Fed. Rep. of Germany

[21] Appl. No.: 670,752

[22] Filed: Mar. 15, 1991

[30] Foreign Application Priority Data

Mar. 17, 1990 [DE] Fed. Rep. of Germany ....... 4008644

[51] Int. Cl.$^5$ ............................................. G01P 15/11
[52] U.S. Cl. ................................. 73/517 R; 73/DIG. 2
[58] Field of Search ............................................. 73/517

[56] References Cited

U.S. PATENT DOCUMENTS

| | | | |
|---|---|---|---|
| 3,168,830 | 2/1965 | Chass | 73/517 R |
| 3,340,738 | 9/1967 | Chass | 73/517 R |
| 3,703,681 | 11/1972 | Johnson et al. | 73/517 R |
| 3,786,674 | 1/1074 | Skujins, Jr. | 73/517 R |
| 4,161,665 | 7/1979 | Buck et al. | 73/DIG. 2 X |
| 4,342,228 | 8/1982 | Savage | 73/517 A |
| 4,365,513 | 12/1982 | Iwasaki | 73/517 R |
| 4,822,999 | 4/1989 | Parr | 73/517 R |
| 4,901,017 | 2/1990 | Zinke | 73/517 R |
| 4,938,065 | 7/1990 | Kobayashi | 73/517 R |

FOREIGN PATENT DOCUMENTS

2432225 7/1974 Fed. Rep. of Germany .

OTHER PUBLICATIONS

Technische Akademie Esslingen-Sensoren MeBaufnehmer 1989—Symposium—May 30–Jun. 1, 1989.

*Primary Examiner*—Hezron E. Williams
*Assistant Examiner*—Michael Brock
*Attorney, Agent, or Firm*—Evenson, McKeown, Edwards & Lenahan

[57] ABSTRACT

A multicomponent acceleration sensor in which the inertial force of a seismic mass effects a variation in an electromagnetic quantity of a plurality of individual transducers. During acceleration, the seismic mass acts in each individual transducer a magnetoelastic measuring layer, the permeability $\mu_r$ of which influences the inductance of a sensor coil. For each spacial direction in which the acceleration is to be determined, a pair of transducers is mounted on a base member coaxially to, and axially spaced from, each other in such a way that an acceleration of the acceleration sensor perpendicular to the axial direction of the sensor coils of the two individual transducers causes an equidirectional variation in inductances of the sensor coils of the two individual transducers, and a signal representing the acceleration status is obtained in at least one evaluation electronics form the inductances of the sensor coils.

20 Claims, 1 Drawing Sheet

MULTICOMPONENT ACCELERATION SENSOR

BACKGROUND AND SUMMARY OF THE INVENTION

The invention relates to a multicomponent acceleration sensor.

U.S. Pat. No. 3,786,674 discloses an acceleration sensor of the generic type which consists of a plurality of individual transducers oriented such that an acceleration in a specific direction leads to an equidirectional variation of the output signals of the individual transducers. In this arrangement, the coil of each of the respective transducers is wound around a magnetostrictive iron core, so that a deformation of the iron core resulting from an acceleration (and leading by virtue of the magnetostriction to a variation in the permeability $\mu_r$ of said iron core) effects a variation in the inductance of the coil. A conclusion is drawn in evaluation electronics concerning the acceleration, from the variation in the inductance of the coil. In this process, the acceleration is transferred to the iron core by means of elements with which the acceleration sensor is supported on the object to be sensed, and which act as seismic masses. Furthermore, measures are described for screening the coil against external interferences. Moreover, it is described how the impedance can be matched in the case of a series connection of the individual transducers, so that the series connection of all individual transducers can be evaluated using only one evaluation electronics.

The disadvantage of this arrangement is that an acceleration in a direction other than that previously defined for the sensing of acceleration, likewise leads to a variation in the inductances of the coils of the individual transducers, since by virtue of mechanical strains said accelerations can also lead to deformations of the iron cores. Consequently, the accelerations can be sensed incorrectly.

German patent document DE-OS 2,432,225 A1 discloses an arrangement having a plurality of sensors for the determination of accelerations in different spacial directions in such a way that the directions of the accelerations to be determined by the individual sensors are linearly independent. However, if magnetostrictive acceleration sensors are used accelerations can still be wrongly sensed, because acceleration that deviates from the previously defined direction of the acceleration to be sensed effects mechanical strains in such a way that an acceleration is likewise sensed by the acceleration sensor.

Furthermore, another prior art device known as a multicomponent acceleration sensor is disclosed in the Symposium "Sensors, Measurement Pick-ups 1989" of the Technical Academy Esslingen (Federal Republic of Germany) from 30th May 1989 to 1st June 1989; publisher: K. W. Bonfig; chapters 2.4, 3 4; page 10.6–10.20. In that device, an acceleration sensor described as a "Piezo Beam" is constructed as active sensor element from bimorphous piezoceramic bending beams. If, in this arrangement, the acceleration sensor connected to a body to be sensed is accelerated in a direction that does not coincide with the axial direction of one of the piezoceramic bending beams, a deflection occurs due to the internal mass of the piezoceramic bending beam. This deflection leads to different charges on the front and rear (relative to the direction of acceleration) side of the piezoceramic bending beam, which are sensed using a charge amplifier which is integrated into the acceleration sensor. In this arrangement, 9 kHz is specified as the resonance frequency of the acceleration sensor. A disadvantage of this known multicomponent acceleration sensor is that a fall from a height of approximately one meter will destroy the instrument due to fracture of the piezoceramic bending beams.

It is an object of the present invention to provide a multicomponent acceleration sensor which is insensitive to mechanical stress, and at the same time to ensure, in a manner that is as simple to realize as possible, accurate detection of the acceleration to be sensed.

According to the invention, this object is achieved in a multicomponent acceleration sensor by applying to a sleeve a soft magnetic and highly magnetoelastic layer, the variation of permeability $\mu_r$ of which can be detected, for example, by means of a sensor coil. In this arrangement, the variation in permeability $\mu_r$ arises from an action of the inertial force of a seismic mass as a consequence of an acceleration. A plurality of such individual are interconnected in such a way as to produce a multicomponent acceleration sensor. A further advantage of the invention with respect to the prior art is that by virtue of the smaller seismic mass a simpler design of the acceleration sensor is possible both with regard to the weight and with regard to the dimensions of the acceleration sensor.

Other objects, advantages and novel features of the present invention will become apparent from the following detailed description of the invention when considered in conjunction with the accompanying drawings.

DETAILED DESCRIPTION OF THE DRAWING

Figure 1:
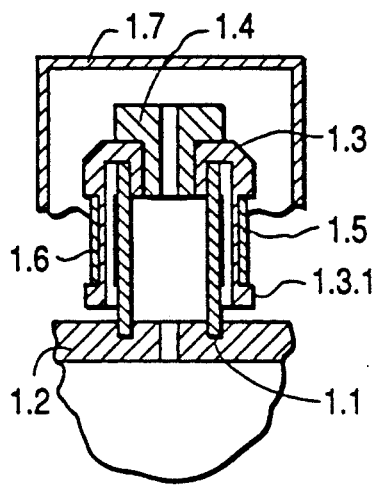
FIG. 1 shows an illustrative embodiment of an individual transducer.

As may be seen from FIG. 1, an individual transducer consists of a thin-walled sleeve 1.1 made of non-magnetic spring steel or stainless steel, which is fastened to a base member 1.2 and also has a rigid connection to a coil member 1.3. In this arrangement coil member 1.3 can consist of a glass-fibre reinforced, highly temperature resistant plastic, or alternatively a metal alloy which is a poor conductor of electricity. Connected non-positively to said coil member 1.3 is a seismic mass 1.4. Said non-positive connection can be realized in this arrangement by locating a thread or threaded insert in the coil member 1.3

In the illustrative embodiment of FIG. 1, the coil member 1.3 contains a groove 1.3.1 for accommodating the sensor coil 1.5, for which tests showed that a number of turns per unit length of approximately 100 to 150 is adequate for a sufficiently precise resolution.

On the thin-walled sleeve 1.1 there is a magnetoelastic measuring layer 1.6 which consists of an amorphous or nanocrystalline, soft magnetic, magnetoelastic nickel-phosphorus layer doped with transition elements. In this arrangement, the nickel fraction can be up to 8%, and cobalt with a fraction of approximately 10% can be used as transition element. In this case, the measuring layer 1.6 is expediently applied to the thin-walled sleeve 1.1 in such a way that a chemical bonding occurs between the measuring layer 1.6 and the thin-walled sleeve. This measuring layer has proved to be very sensitive with reference to the signal level. Consequently, it is possible, for example, to use only very small seismic masses 1.4 and/or to construct the sensor coil 1.5 with the small number of turns per unit length mentioned above. In this arrangement, the seismic mass 1.4 can be exchangeable, so that different measurement ranges can be covered. Moreover, the arrangement described in FIG. 1 can further be provided with a cover 1.7.

Figure 2:
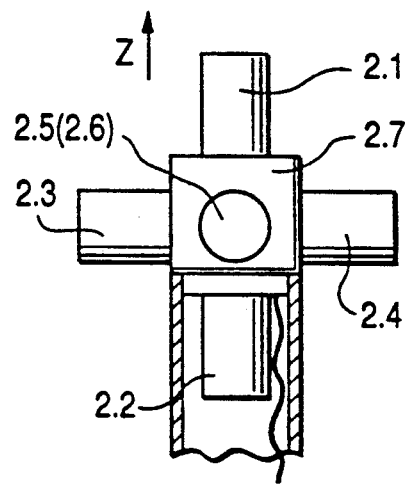
FIG. 2 shows a combination of a plurality of individual transducers to form a multicomponent acceleration sensor.

A multicomponent acceleration sensor according to the invention is shown in FIG. 2 as a 3-component acceleration sensor comprised of the individual transducers described in FIG. 1. In this arrangement, six of the base members 1.2 of FIG. 1 are combined to form a whole base member 2.7 such that six individual transducers 2.1-2.6 are arranged on mutually perpendicular axes. As a result, the sensor coils of two individual transducers are located axially on opposite faces of the base member 2.7 in each of the 3 spacial directions. Depending upon the weight and size requirements for the acceleration sensor, in this arrangement the evaluation electronics can be integrated in the whole base member 2.7.

When an acceleration of the 3-component acceleration sensor of FIG. 2 takes place in the z-direction, due to the force exerted by the seismic mass of transducer 2.1, the associated sleeve is compressed in common with the measuring layer located thereon. Consequently, the permeability of the measuring layer is increased, and thus also the inductance of the associated sensor coil. Simultaneously, the measuring layer of transducer 2.2 is stretched by the sleeve associated with said transducer, and by the seismic mass, and consequently the permeability of the layer is reduced, as is the inductance of the associated sensor coil. In this process, by virtue of the bending of the corresponding sleeves, the measuring layers of the individual transducers 2.3-2.6 are likewise placed under a corresponding mechanical stress.

Figure 3:
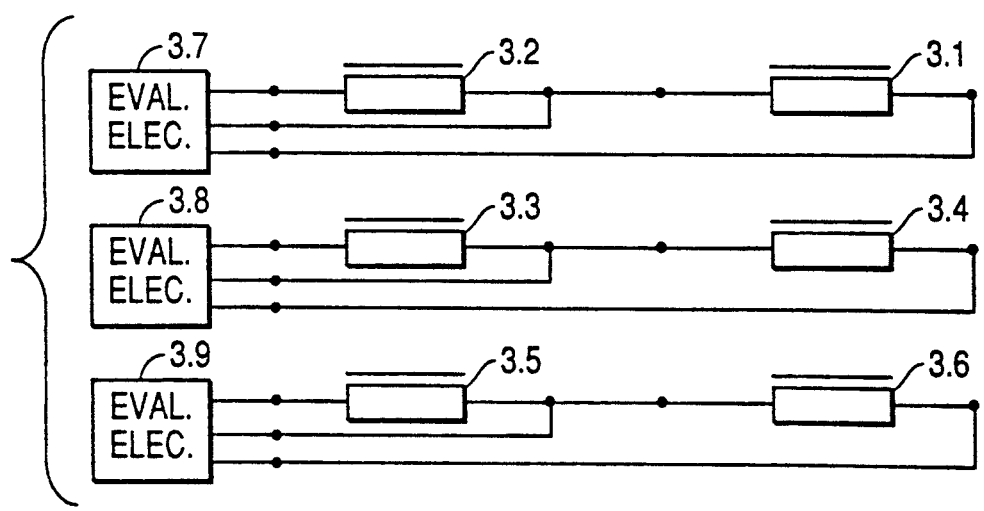
FIG. 3 shows an arrangement of sensor coils of the individual transducers for the purpose of evaluation.

As shown in FIG. 3, the sensor coil 3.1-3.6 assigned to the individual transducers 2.1-2.6 are combined in the evaluation electronics 3.7, 3.8 and 3.9. For example, it is now possible to operate each pair of sensor coils (3.1, 3.2), (3.3, 3.4), (3.5, 3.6) in a difference arrangement, and to evaluate them in a conventional manner in pairs in the evaluation electronics 3.7, 3.8, 3.9. Due to this difference arrangement, it is possible for impedance variations arising by virtue of thermal effects and electromagnetic interference to be largely eliminated. The deflections of the individual transducers are likewise eliminated due to the difference method—assuming that the individual transducers 2.3-2.6 are attached in such a way that given acceleration in the Z-direction they have the same variation in inductance —, so that in accordance with the example of acceleration in the z-direction, an acceleration is established only by the evaluation electronics 3.7 assigned to the sensor coils 3.1 and 3.2, because only the sleeves 1.1 and measuring layers 1.6 are contradirectionally deformed.

In one embodiment, sensor coils 3.1-3.6 may be operated as inductive half-bridges using carrier frequency electronic circuitry, the voltage drops at the impedances of the sensor coils 3.1-3.6 being subtracted in pairs in the corresponding evaluation electronics 3.7, 3.8 and 3.9. The differential voltage thereby set up is directly proportional to the acceleration signal. It is also possible in principle to superimpose a direct current on the carrier frequency, so that specific operating points of the inductances can be set.

Alternatively, the difference method can be implemented by means of measuring frequency variations, with the sensor coils 3.1-3.6 being switched sequentially into an oscillator circuit. (It is, or course, also possible to provide each of the sensor coils 3.1-3.6 with its own oscillator circuit.) A difference in frequency established in one of the evaluation electronics 3.7, 3.8 or 3.9 is then a measure of the acceleration.

In a further embodiment, the acceleration sensor may be constructed as an active sensor, for example by using a permanent magnet as seismic mass, or by connecting a permanent magnet to the seismic mass. In this arrangement, the operating point of the individual transducer is advantageously set such that the remanence of the measuring layer is approximately 70% to 75% of the saturation induction. In the alternative, this same effect can be achieved by having a correspondingly set direct current flow through each of the sensor coils 3.1-3.6. If a variation then takes place in the acceleration of the acceleration sensor, an analog voltage pulse is induced in the corresponding sensor coil 3.1-3.6, which can, in turn, be evaluated by means of the difference method.

As noted previously, the seismic masses can be exchangeably configured. In this way, it is also possible to realize different response sensitivities of the acceleration sensor in different spacial directions.

It is also possible in principle to evaluate the mechanical strains occurring in the respective measuring layers 1.6 of the individual transducers 2.1-2.6 by virtue of bending. However, this arrangement is more complicated in that the inductance of each individual sensor coil 3.1-3.6 must be sensed.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A multicomponent acceleration sensor having a plurality of transducer units, each of which comprises a seismic mass element adapted to exert force on a magnetoelastic measuring layer when said acceleration sensor is accelerated, and a sensor coil disposed adjacent said measuring layer and magnetically coupled thereto in such a manner that magnetic permeability of said magnetoelastic measuring layer influences inductance of said sensor coil;

said transducer units being mounted in pairs on a base member of said acceleration sensor, the respective sensor coils of each pair of transducer units being disposed coaxially to and axially displaced from each other and being oriented such that an acceleration component which is perpendicular to the axis of said sensor coils causes a similar variation in inductance of said sensor coils, and an acceleration, component which is parallel to said axis causes an opposing variation in inductance of said sensor coils.

2. Multicomponent acceleration sensor according to claim 1, wherein the measuring layer consists of nickel, phosphorus and a chemical transition element, the fraction of nickel being up to 8%, and the fraction of the transition element being 10%.

3. Multicomponent acceleration sensor according to claim 2, wherein said transition element is cobalt.

4. Multicomponent acceleration sensor according to claim 2, wherein said measuring layer is attached to a sleeve in such a manner that an acceleration in the axial direction of the sleeve causes said seismic mass to effect a compression or stretching of the measuring layer, and an acceleration perpendicular to the axial direction of the sleeve causes said seismic mass to effect a deflection of the sleeve, wherein there is a chemical bonding of the measuring layer with the sleeve, and wherein a sensor coil is attached around the sleeve in such a way that the sleeve is located coaxially within the sensor coil.

5. Multicomponent acceleration sensor according to claim 2, wherein the sensor coils of the respective pairs of transducers are interconnected to form an inductive half-bridge in order to determine the acceleration in one special direction.

6. Multicomponent acceleration sensor according to claim 2, wherein the impedance of the sensor coils is determined by applying a carrier frequency.

7. Multicomponent acceleration sensor according to claim 2, wherein the impedance of the sensor coils is determined by switching into an oscillator circuit.

8. Multicomponent acceleration sensor according to claim 2, wherein the seismic mass is constructed at least partially as a permanent magnet.

9. Multicomponent acceleration sensor according to claim 1, wherein said measuring layer is attached to a sleeve in such a manner that an acceleration in the axial direction of the sleeve causes said seismic mass to effect a compression or stretching of the measuring layer, and an acceleration perpendicular to the axial direction of the sleeve causes said seismic mass to effect a deflection of the sleeve, wherein there is a chemical bonding of the measuring layer with the sleeve, and wherein a sensor coil is attached around the sleeve in such a way that the sleeve is located coaxially within the sensor coil.

10. Multicomponent acceleration sensor according to claim 4, wherein the sensor coils of the respective pairs of transducers are interconnected to form an inductive half-bridge in order to determine the acceleration in one special direction.

11. Multicomponent acceleration sensor according to claim 9, wherein the impedance of the sensor coils is determined by applying a carrier frequency.

12. Multicomponent acceleration sensor according to claim 9, wherein the impedance of the sensor coils is determined switching into an oscillator circuit.

13. Multicomponent acceleration sensor according to claim 9, wherein the seismic mass is constructed at least partially as a permanent magnet.

14. Multicomponent acceleration sensor according to claim 1, wherein the sensor coils of the respective pairs of transducers are interconnected to form an inductive half-bridge in order to determine the acceleration in one special direction.

15. Multicomponent acceleration sensor according to claim 14, wherein the impedance of the sensor coils is determined by applying a carrier frequency.

16. Multicomponent acceleration sensor according to claim 14, wherein the impedance of the sensor coils is determined by switching into an oscillator circuit.

17. Multicomponent acceleration sensor according to claim 14, wherein the seismic mass is constructed at least partially as a permanent magnet.

18. Multicomponent acceleration sensor according to claim 1, wherein the impedance of the sensor coils is determined by means of applying a carrier frequency.

19. Multicomponent acceleration sensor according to claim 1, wherein the impedance of the sensor coils is determined by switching into an oscillator circuit.

20. Multicomponent acceleration sensor according to claim 1, wherein the seismic mass is constructed at least partially as a permanent magnet.

* * * * *